United States Patent
Goodrich et al.

(10) Patent No.: US 11,731,894 B2
(45) Date of Patent: Aug. 22, 2023

(54) MOBILE WATER TREATMENT SYSTEM

(71) Applicants: GOVERNMENT OF THE UNITED STATES AS REPRESENTED BY THE ADMINISTRATOR OF THE U.S. ENVIRONMENTAL PTT AG, Washington, DC (US); WaterStep, Louisville, KY (US)

(72) Inventors: James A. Goodrich, Cincinnati, OH (US); John Hall, Cincinnati, OH (US); Roy C. Haught, Cincinnati, OH (US); Mark Hogg, Louisville, KY (US); Kurtis Daniels, Louisville, KY (US)

(73) Assignees: GOVERNMENT OF THE UNITED STATES AS REPRESENTED BY THE ADMINISTRATOR OF THE U.S. ENVIRONMENTAL PROTECTION AGENCY, Washington, DC (US); WATERSTEP, Louisville, KY (US)

( * ) Notice: Subject to any disclaimer, the term of this patent is extended or adjusted under 35 U.S.C. 154(b) by 250 days.

(21) Appl. No.: 16/543,010

(22) Filed: Aug. 16, 2019

(65) Prior Publication Data
US 2021/0047220 A1   Feb. 18, 2021

(51) Int. Cl.
*C02F 9/00* (2023.01)
*C02F 9/20* (2023.01)
(Continued)

(52) U.S. Cl.
CPC ............... *C02F 9/20* (2023.01); *A01N 25/08* (2013.01); *A01N 59/16* (2013.01); *C02F 1/001* (2013.01);
(Continued)

(58) Field of Classification Search
CPC ............ C02F 9/00; A01N 59/16; A01N 25/08
See application file for complete search history.

(56) References Cited

U.S. PATENT DOCUMENTS 5,972,216 A * 10/1999 Acernese ................ C02F 9/005
210/253
2002/0046569 A1* 4/2002 Faqih ...................... C02F 9/005
62/188
(Continued)

FOREIGN PATENT DOCUMENTS

CN   105771977 A * 7/2016  ............. B01J 23/50
DE   202016005212 U1 * 9/2016  ............. C02F 9/005

OTHER PUBLICATIONS

CN2221974Y; Mar. 1996; CN, Chlorine Dioxide Sterilizer: Li, Xue-min (Year: 1996).*

*Primary Examiner* — Walter D. Griffin
*Assistant Examiner* — Cameron J Allen
(74) *Attorney, Agent, or Firm* — Stein IP, LLC

(57) ABSTRACT

A mobile treatment system is provided for treating contaminates in water, particularly during emergency situations such as natural disasters and planned attacks. The mobile treatment system includes a mobile framework; one or more treatment modules mounted on the mobile framework; a piping system in fluid communication with the one or more treatment modules, said piping system comprising one or more pumps configured to convey water to and from the one or more treatment modules; and at least one power source to provide power to the one or more pumps and one or more treatment modules. The treatment modules may include pre-filtration, chlorination treatment that generates chlorine by electrolysis, activated carbon treatment, and treatment using a disinfecting, silver coated composite material.

25 Claims, 8 Drawing Sheets

PIPING SYSTEM AND TREATMENT MODULE SCHEMATIC

(51) Int. Cl.
*A01N 59/16* (2006.01)
*A01N 25/08* (2006.01)
*C02F 1/00* (2023.01)
*C02F 1/50* (2023.01)
*C02F 1/467* (2023.01)
*C02F 1/32* (2023.01)
*C02F 1/28* (2023.01)

(52) U.S. Cl.
CPC ............. *C02F 1/283* (2013.01); *C02F 1/325* (2013.01); *C02F 1/4674* (2013.01); *C02F 1/505* (2013.01); *C02F 2201/008* (2013.01); *C02F 2201/009* (2013.01); *C02F 2201/461* (2013.01); *C02F 2303/04* (2013.01)

(56) References Cited

U.S. PATENT DOCUMENTS

| | | | |
|---|---|---|---|
| 2005/0218625 A1* | 10/2005 | Hopper | B60P 3/1033 280/414.1 |
| 2009/0289011 A1* | 11/2009 | Avakian | F24D 17/0073 210/182 |
| 2013/0098816 A1* | 4/2013 | Elfstrom | C02F 9/00 210/153 |
| 2015/0001161 A1* | 1/2015 | Wiemers | B01D 17/047 210/739 |
| 2015/0299000 A1* | 10/2015 | Smith | A61L 2/022 210/748.01 |
| 2015/0368136 A1* | 12/2015 | Raymont | C02F 1/001 210/96.1 |
| 2018/0222783 A1* | 8/2018 | Timmons | C02F 9/005 |

* cited by examiner

MOBILE WATER TREATMENT SYSTEM FLOW CHART

PIPING SYSTEM AND TREATMENT MODULE SCHEMATIC

SURGE TANK AND PUMPING SCHEMATIC

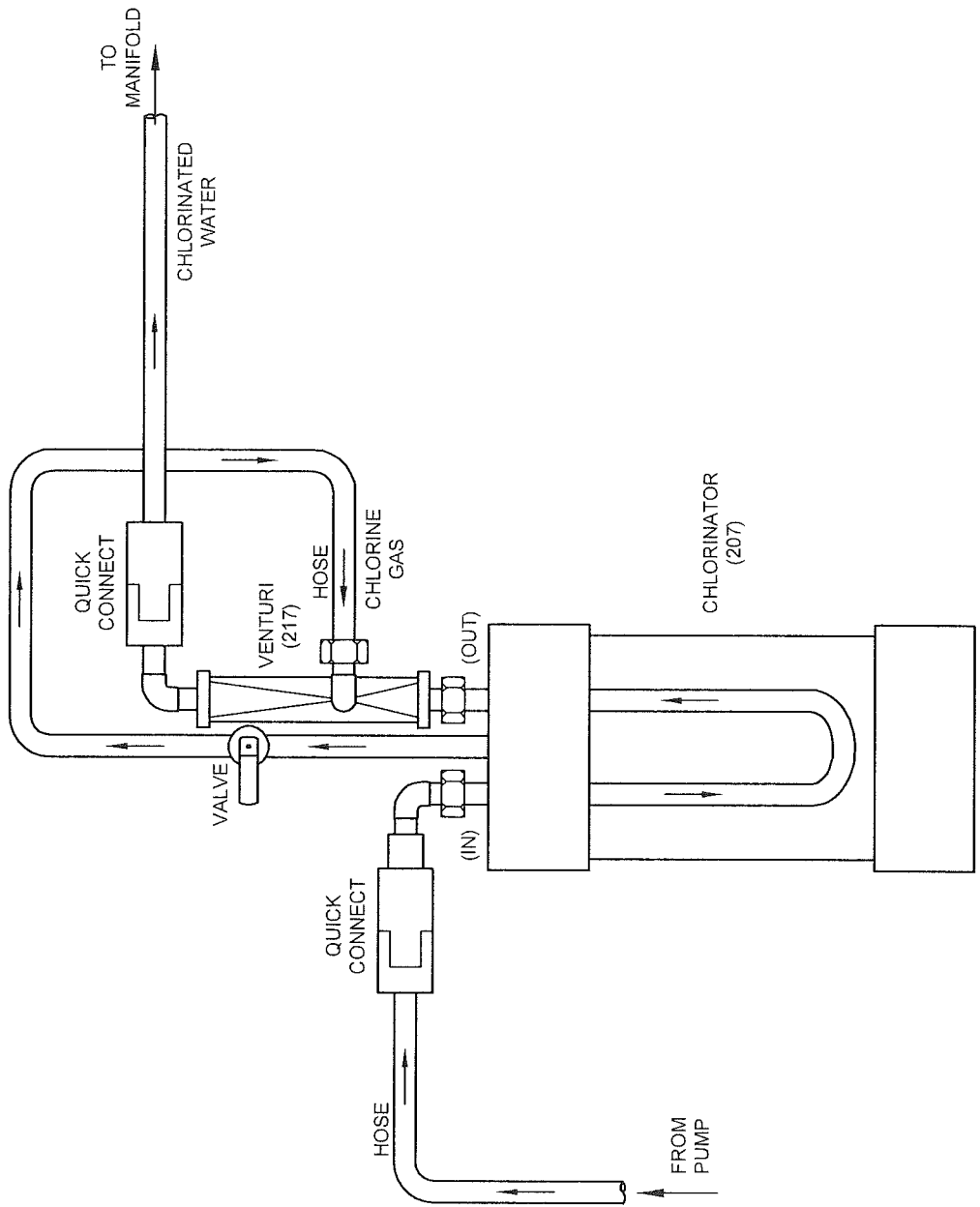

POWER SOURCE SCHEMATIC

SCHEMATIC OF MANIFOLD TO CONNECT WITH THE BLADDER TANK

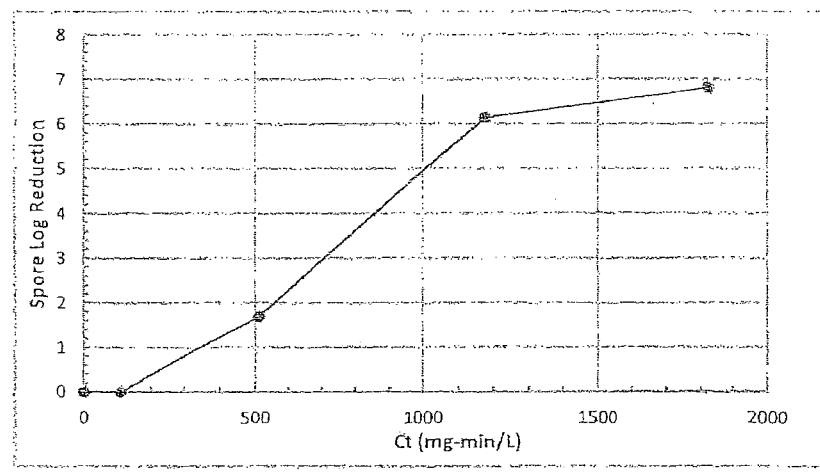
FIG. 5 The log reduction in spores during the experiment plotted against the Ct value (disinfectant concentration multiplied by time).

MOBILE WATER TREATMENT SYSTEM

FIELD OF THE INVENTION

The invention relates generally to treatment of contaminated water, and more specifically to treatment of contaminated water using a mobile water treatment system which may be deployed during emergency situations such as a man-made or natural disaster.

BACKGROUND OF THE INVENTION

Immediate access to clean water during and after emergency situations is critical. Natural disasters and planned attacks can render current power and water infrastructure vulnerable or inoperable. In the event of such an emergency, currently available water filtering systems are energy intensive or inadequate for medium to large scale cleanup. Many times, one filtration system may address only some of the contaminants while being ineffective for others.

Water in need of treatment during an emergency may be contaminated with particulates as well as chemical, biological and radionuclide contaminants. Current emergency water treatment systems are usually large, cumbersome and not designed so the treatment train can be configured on-site to treat a broad spectrum of contaminants without using other unnecessary and costly unit processes and without producing large amounts of contaminated wastes.

Bottled water is typically the first responder's top choice when responding to an incident. However, excessive dependence on bottled water creates a large solid waste disposal problem, and often large vehicles transporting bottled water are unable to get to affected locations because of road debris and damage. Moreover, bottled water in large or extended recovery situations cannot be used for cooking, bathing and sanitation purposes. On the other hand, bottled water may be used in conjunction with an inexpensive and versatile mobile emergency water treatment system providing water for other non-drinking water applications. Not all the water being treated needs to be drinking water quality. In some cases, contaminated stormwater or wash water from building decontamination activities need only to be treated to levels safe for disposal to the wastewater treatment plants or to the environment. For longer-term mitigation efforts, large volumes of contaminated wash water may be produced and needs to be safely transported and disposed of in a hazardous waste facility. Mobile treatment of the contaminated water may significantly reduce the volume of water to be transported and thus reduce the liability and cost of transporting and disposing of a hazardous waste.

Typically, in a situation where decontamination with water must occur, the runoff is usually collected and shipped offsite. Any runoff that enters the surrounding environment could spread the contaminant outside the containment field, risking further damage. No adequate systems exist for onsite cleanup of post-decontamination events.

Most of the existing emergency water treatment units are large, expensive tractor-trailer mounted systems. They are difficult to operate and maintain in part because they often use reverse osmosis as the water treatment technology.

In view of the problems discussed above, there is a real need for a mobile water treatment system that is: compact, portable, requires low energy inputs, is simple to set-up and use, and can treat a broad array of contaminants. Such contaminants may include typical industrial, municipal and stormwater contaminants, as well as contaminants from biological and chemical weapons. The system must be compact and mobile enough to be rapidly transported into areas experiencing an emergency or natural disaster (e.g., an earthquake, a hurricane, a war zone) and be designed to treat water contaminated with various levels and types of contamination to drinking water standards.

Accordingly, the principal object of the invention is to provide such a mobile wastewater treatment system to avoid having to ship contaminated water offsite.

SUMMARY OF THE INVENTION

Broadly stated, the objects of the invention are realized, according to one aspect of the invention, by providing a mobile treatment system for treating contaminates in water. The mobile treatment system may include a mobile framework; one or more treatment modules mounted on the mobile framework; a piping system in fluid communication with the one or more treatment modules, said piping system including one or more pumps configured to convey water to and from the one or more treatment modules; and at least one power source to provide power to the one or more pumps and one or more treatment modules. The one or more treatment modules may include a chlorination treatment module.

According to one aspect of the invention, the chlorination treatment module generates chlorine by electrolysis using a chloride salt. In another embodiment of the invention, the chloride salt is sodium chloride, which is readily available as table salt.

Advantageously, the treatment system of the invention is mobile and can be moved to the location of the contaminated water in need of treatment. The treatment modules may be chosen and arranged to treat a variety of contaminants in the water.

According to one aspect of the invention, the mobile water treatment system further includes at least one pre-filter that is adapted to filter the contaminated water prior to entering treatment modules in the mobile water treatment system. The primary purpose of the pre-filter is to separate out particulate solids from the contaminated water. The "pre-filters" may be located throughout system but are typically located just upstream of the treatment modules.

According to another aspect of the invention, the one or more treatment modules further include activated carbon treatment. Activated carbon is effective in adsorbing natural organic compounds, taste and odor compounds, and synthetic organic chemicals in water treatment.

According to one aspect of the invention, the one or more treatment modules further include treatment using a disinfecting composite material. The disinfecting composite material may include a silver-coated composite material (e.g., a germicidal composite material). The germicidal composite material may include a support substrate; one or more micrometric aggregates of titanium oxide on the support substrate, the titanium oxide aggregates comprising chloride atoms; and one or more micrometric aggregates of silver attached to the chloride atoms of the titanium oxide aggregates. The micrometric aggregates of titanium oxide with silver atoms have a germicidal activity. The silver atoms may be metallic, and the support substrate may be silica or alumina.

According to one aspect of the invention, the one or more power sources may include at least one member of the group consisting of a battery, a solar cell, utility electric power, and a generator.

The contaminants that may be treated in the mobile water treatment system of the invention include but are not limited to physical contaminants, chemical contaminants, biological contaminants, or mixtures of the same.

The water may be treated at a rate from about 1 to about 10 gallons per minute. According to one embodiment of the invention, the water may be treated at a rate from about 5 to about 6 gallons per minute.

According to one aspect of the invention, the one or more treatment modules further comprise a UV treatment module. According to another aspect of the invention, the one or more treatment modules may further include at least one of ion exchange, ultrafiltration and ozone treatment.

According to one embodiment, the invention embraces a mobile treatment system for treating contaminates in water, the mobile treatment system including a mobile framework; one or more treatment modules mounted on the mobile framework; a piping system in fluid communication with the one or more treatment modules, said piping system including one or more pumps configured to convey water to and from the one or more treatment modules; at least one power source to provide power to the one or more pumps and one or more treatment modules; and at least one pre-filter that filters the contaminated water prior to entering the mobile water treatment system. The one or more treatment modules may include (i) a chlorination treatment module that generates chlorine by electrolysis of a chloride salt (e.g., sodium chloride), (ii) an activated carbon treatment module and (iii) a treatment module using a disinfecting composite material comprising a silver coated composite material.

According to one aspect of the invention, the mobile water treatment system is configured to convey water to and from the one or more treatment modules in any sequence. For example, in one aspect of the invention, the water to be treated may be directed from an activated carbon treatment module to a treatment module using a disinfecting compound, to UV disinfection module, to a chlorination treatment module. In another aspect of the invention, the water to be treated may follow the same pathway as described in the preceding sentence, with the exception of the UV disinfection module, which is not included in this aspect. In yet another aspect of the invention, activated carbon treatment and treatment using a disinfecting compound is accomplished in the same module, a module including two (2) media filters, one media filter housing the activated carbon and the other media filter housing the disinfecting compound.

According to one aspect of the invention, the mobile water treatment system further includes one or more valves, one or more hoses, and one or more quick connect fittings.

BRIEF DESCRIPTION OF THE DRAWINGS

The invention is more fully described by reference to the following detailed description and the accompanying drawings wherein:

FIG. 2(c) is a schematic of a portion of the mobile water treatment system providing details on the chlorination system.

FIG. 5 is a graph showing the log reduction in spores vs. the Ct value (disinfectant concentration multiplied by time) when testing was conducted using one embodiment of the mobile water treatment system of the invention.

DETAILED DESCRIPTION OF THE INVENTION

Figure 1:
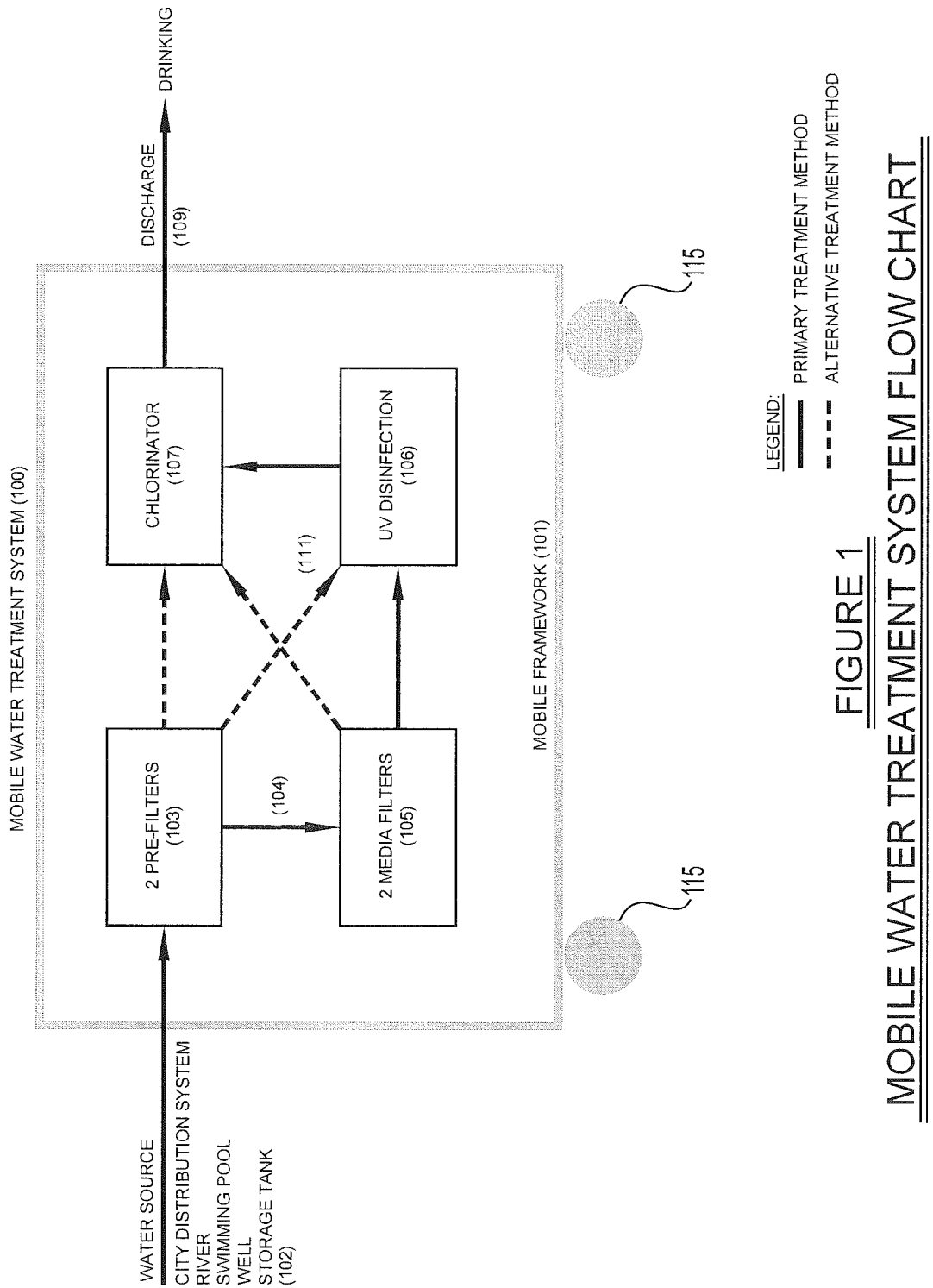
FIG. 1 is a schematic and flow chart of an embodiment of the mobile water treatment system.

The mobile water treatment system of the invention is designed to treat a variety of contaminants, including physical (e.g., sediment and particulate matter), chemical (metals, salts, oil and petroleum products, and other volatile organic chemicals (VOC's)), and biological (bacteria, viruses, protozoa) contaminants. In some circumstances, the contaminants may derive from the manufacture, storage and transportation of chemical and biological weapons.

The mobile water treatment technology system of the invention may also be referred to as the Water-On-Wheels (WOW) Cart. According to one embodiment of the invention, the mobile treatment system includes a pre-filter, an on-site chlorine generator, and a pump attached to a dolly or frame with wheels. The frame also may provide space to store accessory equipment and to transport two empty 1,250-gallon bladder tanks used to store treated water. Building upon this original embodiment, the inventors designed, built, challenged and deployed other embodiments of the mobile water treatment systems with expanded water treatment and power supply capabilities. The system integrated the pre-filtration step with additional media filtration (e.g., granular activated carbon and disinfecting composite material) and on-site chlorine gas generation with options for UV LED and/or ultrafiltration membranes, which were all stored and transported on a wheeled, powder-coated steel frame. According to other embodiments of the mobile water treatment system of the invention, the inventors added multiple power supply options that may be operated from the electrical grid (110 v AC), a duel-fuel generator, and peripherals with a 12 v DC deep cell marine battery (with solar recharge). There are also additional electrical outlets and USB ports for phones, computers and the like. According to another embodiment of the invention, the mobile water treatment system may also produce liquid bleach for sanitation purposes.

As discussed in more detail below, one embodiment of the mobile water treatment system (Version 2.0) was challenged with *Bacillus globigii* spores (a non-pathogenic surrogate for anthrax spores) from a dirty lagoon at the EPA Water Security Test Bed located near Idaho Falls, Idaho. The mobile system was easily deployed and able to produce a large amount of chlorine, but it could not overcome the large chlorine demand from the lagoon. Thus, it was determined that the mobile water treatment system should be operated in batch mode utilizing a bladder tank to overcome chlorine demand of the dirty water by providing controlled contact time. This setup then demonstrated greater than 7 log reduction of the anthrax surrogate. Shortly after this successful testing, Hurricane Maria slammed Puerto Rico. The inventors were able to deploy over 100 disaster kits (with a pre-filter and chlorine generator) to municipal governments and to other non-profit organizations. Learning from both the field challenge and Hurricane Maria experience, another embodiment of the mobile water treatment system of the invention was fabricated. It was challenged with secondary wastewater at the EPA Test and Evaluation Facility located in Cincinnati, Ohio and subsequently successfully tested again at the Water Security Test Bed against lagoon water contaminated with diesel fuel and *Escherichia coli*. The mobile water treatment system successfully removed 4 to 6 Logs of *E. coli* and Total Coliforms respectively from the contaminated lagoon simultaneously with diesel fuel components. Diesel fuel components were removed to below detection levels as well. Results of these evaluations are provided in more detail below.

According to embodiments of the invention, the mobile water treatment system is portable and requires low energy inputs. The mobile water treatment system of the invention is particularly useful for treating contaminated water during emergency situations, both natural and man-made. For example, the mobile water treatment system of the invention may be useful in treating water in an area adversely affected by a hurricane or earthquake. The mobile water treatment system of the invention may also be useful in treating water in an area affected by war or a cyber-attack. In many of these scenarios, electric grid power may be lost for long periods of time, necessitating a mobile treatment system that includes its own power sources.

The mobile water treatment system of the invention is also be equipped with a variety of treatment options that are in the form of treatment modules. This includes modules to treat physical contaminants, such as sediment and particulate matter; biological contaminants, such as bacteria, viruses and protozoa; and chemical contaminants, such as petroleum products, VOC's, organic toxins, metals, salts. Accordingly, in embodiments of the invention, the mobile water treatment system may include treatment modules such as chlorination (e.g., chlorination that may be used onsite using electrolysis of readily available and inexpensive table salt), activated carbon treatment, and (iii) treatment using a disinfecting composite material comprising a silver coated composite material. This particular combination of treatment options as part of a mobile treatment platform having its own power source, has been found particularly useful in treating water in an area that has been adversely affected by a natural disaster or in another emergency situation.

Referring more specifically to the drawings, FIG. 1 provides a schematic and flow chart of an embodiment of the mobile water treatment system 100 of the invention. The mobile framework 101 provides the water treatment system with its mobility and functions as a support structure for the one or more treatment modules mounted on the framework. The mobile framework includes a means of transportation. In one embodiment, the framework has four wheels 115 and may be moved under either human force (e.g., pushing as one would a cart) or mechanical force (e.g., towed by a truck or automobile or carried in a truck bed or on a trailer).

The contaminated water source 102 may take many forms, including but not limited to a storage tank, a well, a pool (e.g., swimming pool), a river, a creek, a lake or pond (e.g., a stormwater retention pond), a municipal drinking water distribution system, a cistern, municipal wastewater collection system, or an industrial distribution system. In one embodiment of the invention, the contaminated water may be pumped from the source to the mobile water treatment system 100.

The type of pumps used to distribute water in the treatment system are not particularly limited. For example, in one embodiment of the invention a Star Water Systems (Flint & Walling) ½ HP ESO5S/630 GPH/115 v OR 230 v, Pre-mounted Compact Tank/Shallow Well Jet Pump System was used to pump the water throughout the system.

As with the pump, the type of pipe or tubing used to convey the water throughout the system is not particularly limited. In one embodiment, the invention used 1"-¾"-½" PEX Piping; PEX Brass Fittings and PEX Brass Valves; 1½", ¾" and ½" Lasco, Spear and other Schedule 80 PVC Piping and PVC Fittings; ¼", 7/16", ⅜" and Continental-ContiTech ⅝" Coilhose Polyethylene, Polypropylene and Silicone Tubing. Other fittings and adaptors were also used, including a variety of quick connect adaptors.

The mobile water treatment system of the invention may include one or more treatment modules mounted on the framework. In an embodiment of the invention, the mobile water treatment system includes two or more modules mounted on the framework. The two or more treatment modules may be arranged for use according to a number of possible treatment paths.

One treatment module 105 used in an embodiment of the invention is a germicidal composite material comprising a support substrate; one or more micrometric aggregates of titanium oxide on the support substrate, the titanium oxide aggregates comprising chloride atoms; and one or more micrometric aggregates of silver attached to the chloride atoms of the titanium oxide aggregates, wherein the micrometric aggregates of titanium oxide with silver atoms have a germicidal activity. The silver atoms may be metallic. This technology is discussed in U.S. Pat. No. 9,650,265, which is incorporated herein by reference.

Another treatment module used in an embodiment of the invention is chlorination 107. The specific type of chlorination process used in a chlorination module is not limited. According to one embodiment of the invention, the chlorination treatment module generates chlorine by electrolysis of a chloride salt. The chloride salt may be, for example, sodium chloride.

According to one embodiment of the invention, the chlorination treatment module uses the M-100 chlorine generator technology produced by WaterStep. This technology produces chlorine gas by applying a direct electrical current into salt water on site. The technology is cost-effective in that the raw materials—water and regular table salt—are inexpensive and easily available, even in emergency areas. Additionally, chlorine gas is a very effective disinfectant for variety of biological contaminants in water.

According to one embodiment of the invention, the mobile water treatment system employs both the germicidal composite material treatment module and the chlorination treatment module. This combination of treatment technologies has been found to be particularly effective in treating water containing a variety of contaminants, although additional treatment modules also may be used.

According to another embodiment of the invention, the mobile water treatment system includes an activated carbon treatment module. It has been found that the combination of germicidal composite material treatment, activated carbon treatment, and chlorination treatment in the mobile water treatment system is also particularly effective in treating contaminated water. The three treatment technologies may be used in any sequence, although in one embodiment of the invention the sequence is first activated carbon treatment, followed by germicidal composite treatment and chlorination treatment.

According to one aspect of the invention, the mobile water treatment system includes both activated carbon and a germicidal composite material used in series within the same treatment module 105.

According to another embodiment of the invention, the mobile water treatment system includes a module comprising both germicidal composite material and activated carbon as well as a chlorination module 107. The flow of the contaminated water is directed from a water source 102, optionally through one or more pre-filters 103 before proceeding to a module 105 that incorporates both germicidal composite material units and activated carbon units. The water is then directed to a chlorination module 107 (e.g., a chlorination module that generates chlorine by electrolysis using sodium chloride) prior to discharge 109, either into the environment (e.g., a river or stream) or into a storage system for further use (e.g., as potable water).

According to an embodiment of the invention, the water, is directed to a bladder tank after chlorination to provide adequate residence for disinfection. The residence time may be from about 2 to about 4 hours when the chlorine concentration in the treated water is in the range of about 2 ppm. The residence time may be lower than 2 hours (e.g., as low as 30 minutes) when the chlorine concentration is from 2-3 ppm.

Other treatment modules may include ultraviolet disinfection 106. The type of ultraviolet disinfection technology used is not particularly limited and may include, for example, Solstreme, Aqua Pearl, or ATS Waterline.

According to one embodiment of the invention, an Aquisense Technologies, LLC UV-C LED water treatment device is used as the UV treatment system. The Aqua Pearl 24G device is 120 mm wide by 133 mm tall by 120 mm long and operates at a 1.5 to 2.2 liter/min throughput.

According to one aspect of the invention, the flow of contaminated water is directed from a water source 102 through one or more pre-filters 103, through a module 105 that incorporates both germicidal composite material units and activated carbon units, through a UV disinfection module 106, through a chlorination module 107 before discharge 109.

According to one embodiment of the invention, ozone treatment 108 may be used as an optional treatment module.

The sequence or order of wastewater treatment modules through which the contaminated water is directed is not limited. The operator of the mobile water treatment system may direct the flow path of the contaminated water through the treatment modules in accordance with the type and level of contamination in the water as well as the required treatment standards.

The one or more modules are in fluid communication with one another via piping, tubing, and associated accessories (e.g., fittings, joints, valves, disconnects) to convey the water into, throughout and out of 109 the mobile treatment system.

The mobile water treatment system of the invention is designed with a piping system that provides the operator with a great degree of flexibility in designing the desired treatment pathway and approach. One feature of the mobile treatment system of the invention is that the flow pathway through the various treatment modules in the system may be quickly arranged or rearranged based on water treatment needs. The use of quick connect fittings, hoses, and valves leading into and out of the various treatment modules allow for such prompt arrangement.

The water treated in the mobile water treatment system may be treated to produce drinking water quality, meeting EPA required drinking water treatment standards under the Safe Drinking Water Act. The water also may be discharged to a receiving stream meeting the discharge standards under the Clean Water Act and any state or local requirements.

Figure 2A:
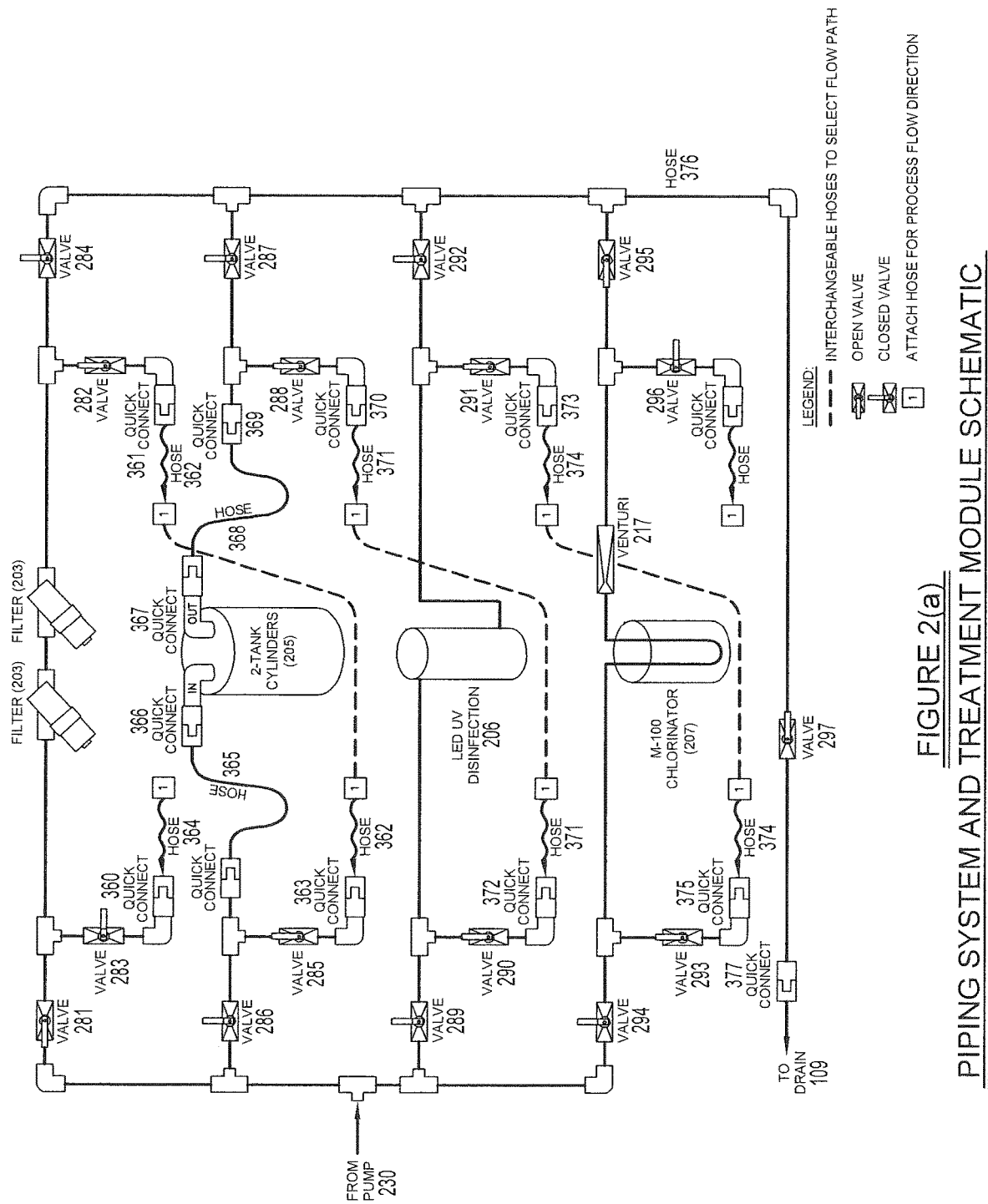
FIG. 2(a) is a schematic of a portion of the mobile water treatment system of the invention showing the piping system and treatment modules.
Figure 2B:
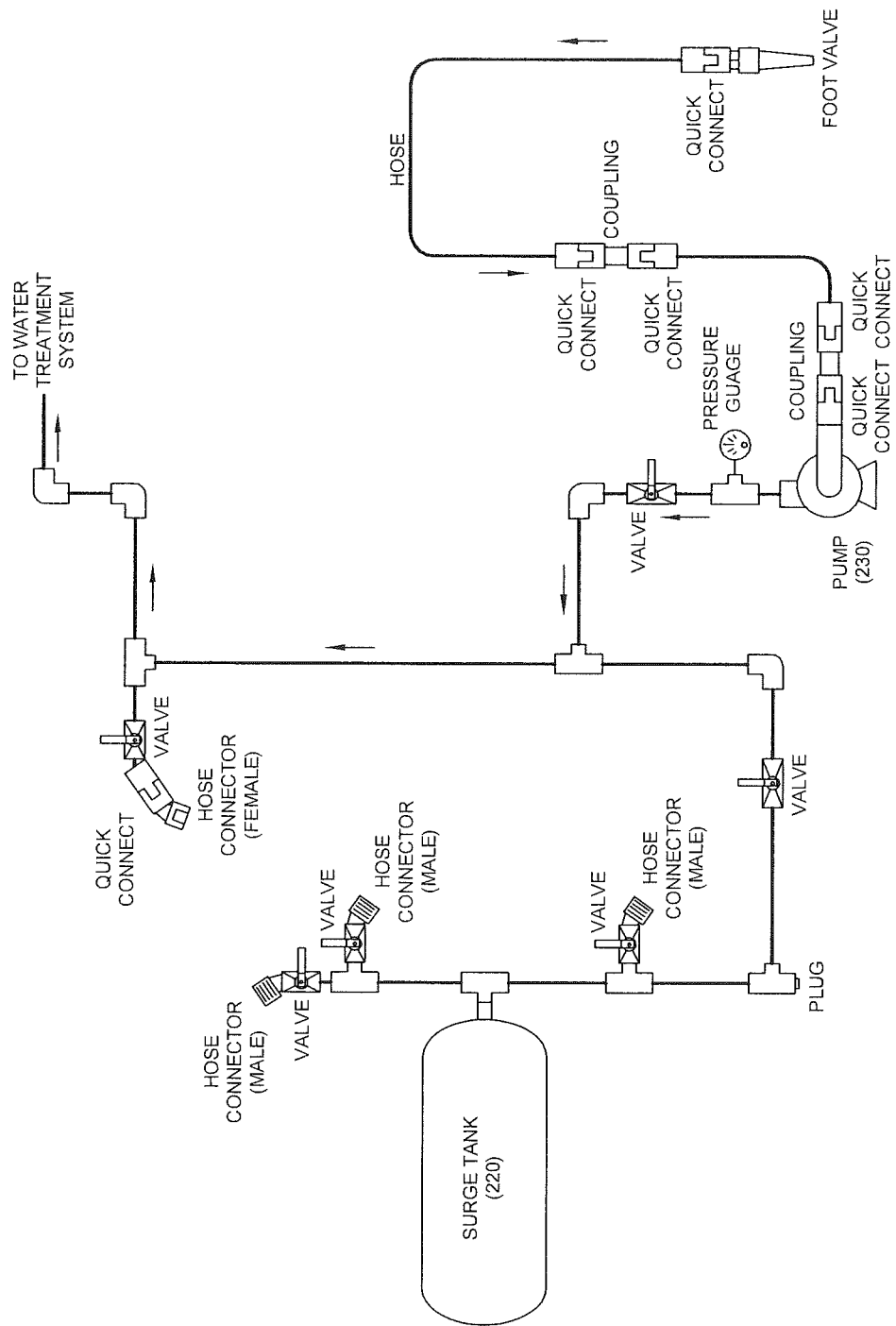
FIG. 2(b) is a schematic of a portion of the mobile water treatment system focusing on the surge tank and pumping system.

FIG. 2(*a*) is a schematic of the piping system and treatment system of an embodiment of the mobile water treatment system. The detailed schematic shows four optional flow paths for the contaminated water. The top path includes two filters 203, which are typically employed as pre-filters for the contaminated water before it is directed to the specific treatment modules. A pump 230, not shown in this figure, is used to convey the contaminated water throughout the system. In an embodiment of the invention, hoses may be attached to connectors (e.g., banjo connectors, camlock connectors) to direct the flow through the desired path, depending on the type of treatment desired. For example, the flow may be directed from the pump to pre-filters 203 by opening valve 281 and closing valve 283. The flow may then be directed to 2-tank cylinders 205 via open valve 282, quick connect 361, hose 362, quick connect 363, open valve 285, quick connect 364, hose 365, and quick connect 366. In this instance, valve 284 is closed. The two tank cylinders 205 may both be filled with activated carbon or both be filled with a disinfecting composite material. In another embodiment of the invention, one of the two tank cylinders is filled with activated carbon and the other is filled with a disinfecting composite material.

After treatment in the 2-tank cylinders 205, and depending on the types and concentrations of contaminants in the water source, the flow may be directed to the LED UV Disinfection Unit 206 for further treatment. In this aspect of the invention, the flow is directed out of the 2-tank cylinders 205 by connecting quick connect 367 and hose 368 to the exit port of the tank cylinders module 205. Quick connect 369 is connected to valve 288, which is opened to allow the water to flow to the LED UV Disinfection Unit through quick connect 370, hose 371, quick connect 372 and open valve 290. Valve 289 is closed to ensure the partially treated water is directed to the LED UV Disinfection Unit 206.

After treatment in the LED UV Disinfection Unit 206, the flow may be directed to the chlorination treatment module 207 for further treatment. Chlorination is typically a core treatment module in the mobile treatment system of the invention. The flow is directed to the chlorination treatment module by opening valves 291 and 293, while closing valves 292 and 294. Hose 374 is connected between valve 291 and 293 via quick connects 373 and 375. The flow exits the chlorination treatment module 207 to drain 109 via venturi 217, hose 376, quick connect 377, with valves 295 and 297 open to allow the treated water to proceed to the drain. Valve 296 is closed.

FIG. 2(*b*) presents a schematic of an embodiment of the tank and pumping system for the mobile water treatment system of the invention. Surge tank 220 may serve as a reservoir for contaminated water from the source that will be treated. Pump 230 is connected to surge tank 220 through a series of pipes, valves. The pump may be used to convey the contaminated water from the surge tank to the mobile water treatment system.

FIG. 2(*c*) shows an embodiment of the chlorination treatment module used in the mobile water treatment system of the invention. This embodiment of the invention uses an M-100 chlorinator by WaterStep. The device operates by electrolyzing a salt water, typically water with table salt (sodium chloride), by adding direct electric current to perform electrolysis. This produces chlorine gas, which, passes through venturi injector 217. The chlorine gas is then redirected into the chlorine treatment unit such that the chlorine gas contacts the contaminated water. The contaminated water with chlorine gas may then be directed to a bladder tank (not shown) to provide the chlorine additional retention time to treat the contaminants in the contaminated water.

Figure 2D:
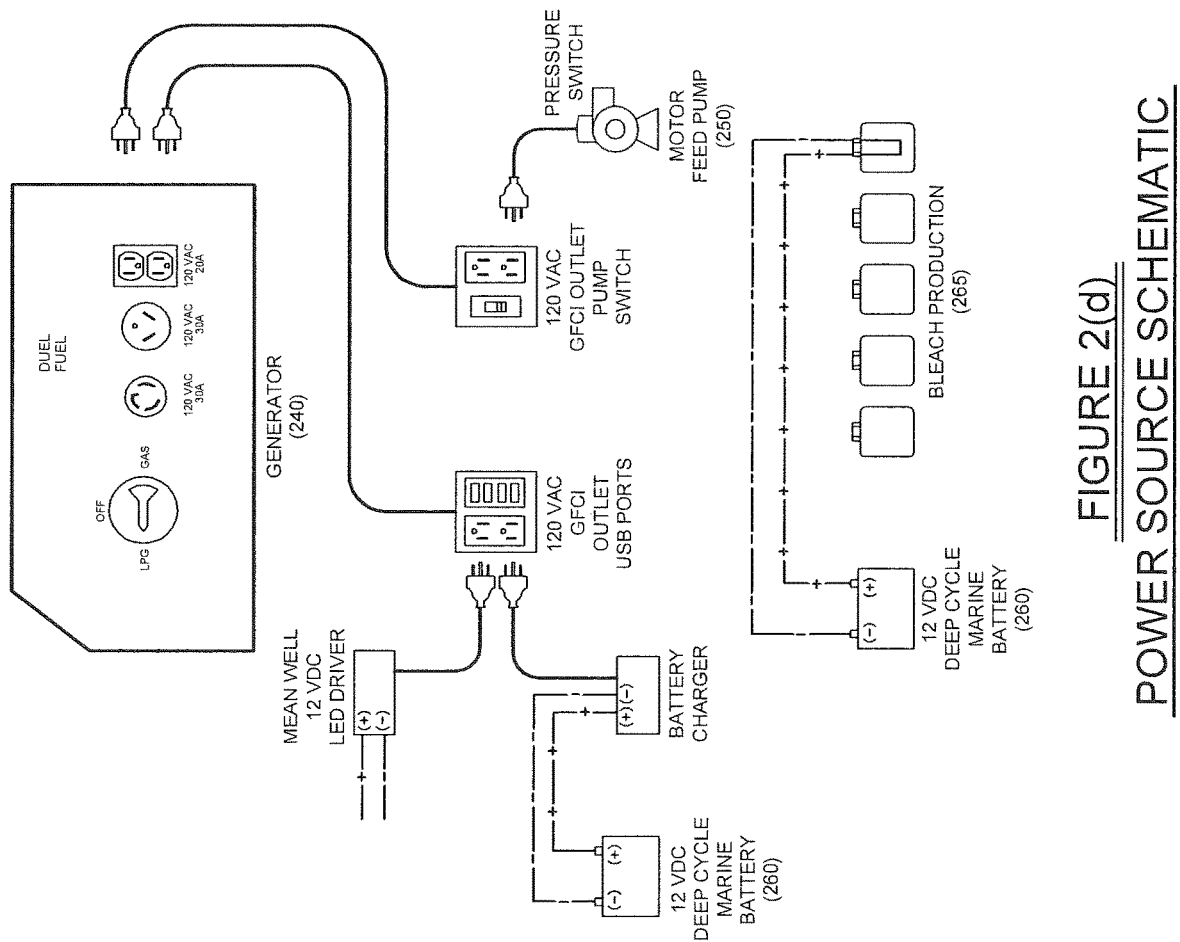
FIG. 2(d) is a schematic of a portion of the mobile water treatment system providing details on the power sources.

FIG. 2(d) presents several power options for the mobile treatment system of the invention. One such option is a dual fired generator 240, which may provide power to, for example, pumps 250, instrumentation (not shown), treatment modules (e.g., the chlorination treatment module). Another power option is rechargeable batteries 260, which may also be used to produce a bleach solution from salt water (electrolyzing NaCl produces chlorine gas and NaOH bleach) 265. The dual fired generator 240 may be used to recharge the batteries 260. Other power sources include solar power (not shown in this figure) and the electric grid, assuming it is operable.

Figure 3:
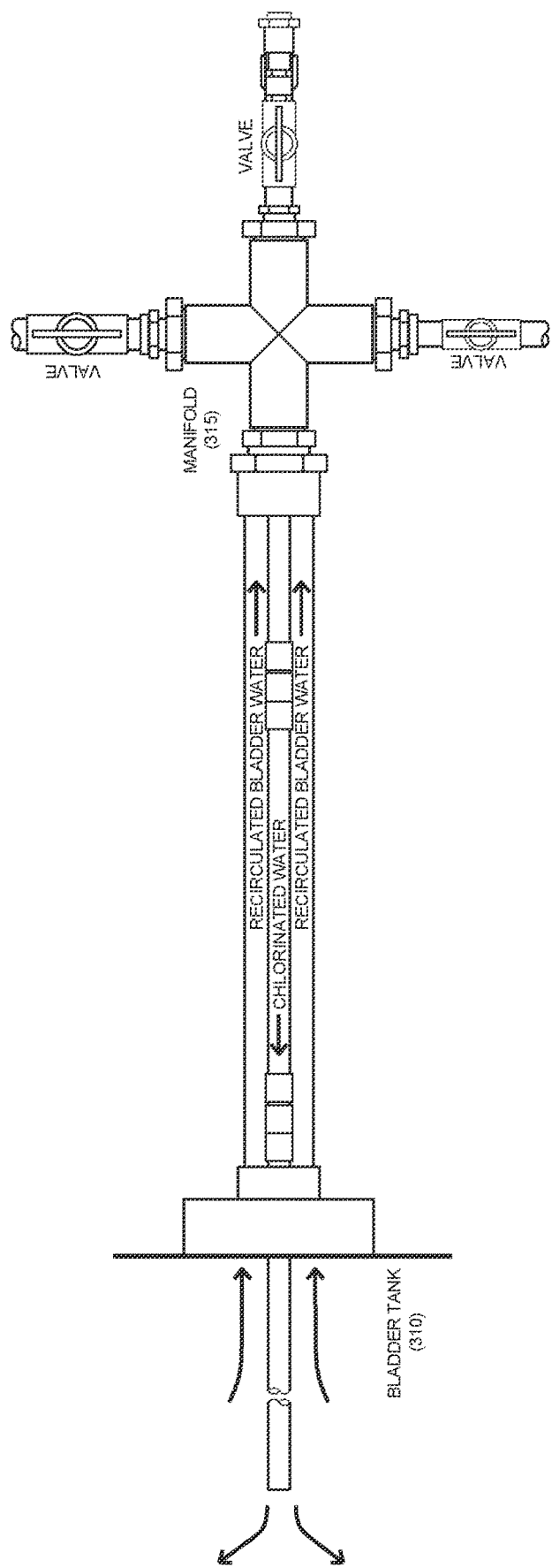
FIG. 3 is a schematic of a manifold to connect with the bladder tank according to one embodiment of the mobile water treatment system of the invention.

FIG. 3 shows a detailed view of the manifold 315 which directs recirculated chlorinated water to and from a bladder tank 310 prior to release as sanitized chlorinated drinking water. According to this embodiment of the invention, the bladder tank 310 ranges from 1,000 gallons to 1,500 gallons in volume. A residence time of 2 to 4 hours is ideal to ensure full treatment of the remaining contaminants in water prior to discharge as sanitized chlorinated drinking water for distribution. Chlorinated water from the chlorination module 207 is directed through manifold 315 and into the bladder tank 310 to achieve adequate residence time, before being recirculated back to manifold 315.

EXAMPLES

Preliminary testing was conducted to determine the operability and performance of an embodiment of the mobile treatment system of the invention. This experiment was designed to assess the ability of the mobile treatment system within this treatment train to treat a large volume of water containing *Bacillus globigii* spores, a surrogate for anthrax contamination, as well evaluate the ease of operation and setup. The tests were conducted at the National Homeland Security Research Center's Water Security Test Bed (WSTB) as part of the Department of Energy's Idaho National Laboratory located near Idaho Falls, Id.

The WSTB consists primarily of an 8-inch (20 cm) diameter drinking water pipe oriented in the shape of a small drinking water distribution system (US EPA, 2016b). The WSTB contains ports for simulating water demand from service connections and a 15-foot (5 m) removable coupon section designed to sample the pipe interior. The water from the WSTB system is discharged to a lagoon that has a water storage capacity of 28,000 gallons (105,980 L).

Water from the lagoon was used for studies on disinfection technologies to determine their ability to treat large volumes of biologically contaminated water. Water in the lagoon contained dirt and sediment from the surrounding area, as well as algae. The dirt and algal growth created disinfectant demand in the water and rendered the water "dirty." *Bacillus globigii* (BG) spores were dumped into the lagoon in order to simulate contaminated wash water resulting from the decontamination of a drinking water pipeline or building with a contamination goal of $10^5$ to $10^7$ cfu/100 ml.

The effectiveness of the treatment technology was evaluated by sampling the lagoon water containing BG spores before it entered the mobile treatment system. The concentration of BG spores in the influent (or before treatment) was then compared to the concentration in the effluent (after treatment).

On-Site Chlorinator Used in Lagoon Water Testing

The mobile water treatment system was challenged to assess its disinfection capability. The self-contained device was shipped in a pallet/skid for easy deployment. It was mounted on one locking, rolling storage cart with the following components:

1. The WaterStep M-100 chlorinator (an onsite chlorine generator)
2. Pumps: circulating pump (12V DC), distribution pump (120V AC) and a hand pump
3. Electrical Components: connectors and cords for equipment needing a power supply including a ground fault interrupter, one 12V DC, a deep cycle battery, a storage case, a solar panel, and one 10/2/50 ampere automatic battery charger
4. Plumbing Components: tubing and quick-connect camlock fittings for all water connections.

The chlorinator uses salt (sodium chloride in this case) and the process of electrolysis based on direct current from a 12-volt battery to produce chlorine gas and sodium hydroxide. Table salt purchased from a grocery store was used in this experiment. The system runs an electrical current between the two electrodes, separated by a membrane, in a solution of sodium chloride. Electrolysis breaks up the atoms in the salt molecules and frees chlorine gas from the brine. The chlorine gas is then used as the disinfectant. A small amount of sodium hydroxide is generated, which can be reused for other purposes at the response site as needed.

The chlorine gas was introduced into the water stream using a venturi tube connected to the chlorine generator. A pressure pump (a shallow well pump with bladder tank and a pressure switch) was used to draw water from the lagoon and to circulate it through the venturi using a garden hose. As the water passes through the venturi, it creates a vacuum which draws the chlorine gas out of the chlorine generator. As the water is mixed with the chlorine gas, it flows through and returns to the source or a bladder tank for storage and disinfection contact time. This process is typically continued until the free chlorine concentration in the finished water reaches the desired level.

The mobile treatment system has the capability to pump water into portable bladders of any volume (e.g., 10,000 gallon (37,850 L)), where the contaminated water is temporarily stored to provide contact time for disinfection before treated water is disposed of or discharged. These bladders were not used during tests at the Idaho National Laboratory. Rather, the mobile treatment system was set-up to pump contaminated water directly from the lagoon through the chlorinator and then recirculated back into the lagoon for storage and contact time, thus allowing disinfection to occur. During planning of the water treatment experiments, the inventors determined that pumping water from the lagoon directly into the chlorination unit (and bypassing the bladders) would be a more accurate representation of how the unit might be deployed during an emergency water treatment scenario. The inventors expected the enclosed lagoon would provide the necessary contact time and storage.

Operationally, water was drawn from near the lagoon inlet (the presumed point of highest contamination in the lagoon) into the mobile treatment system. The chlorinated effluent from the mobile treatment system was pumped back into the far end of the lagoon, while a portion of the untreated effluent water was re-directed to another portion of the lagoon, away from the inlet near the WSTB piping, to increase or promote mixing within the lagoon, which was not mechanically mixed.

The treatment unit operated for 4 hours and 40 minutes. Throughout this period, samples from the chlorinated water outlet were collected and analyzed for free chlorine using a swimming pool kit. The numbers reported were consistently above 5 ppm (the kit can only report values up to 5 ppm). Field dilution was not performed because this was simply a check to determine if chlorine was being generated by the system. Grab samples were collected from the lagoon to evaluate the chlorine levels and were submitted offsite for analysis of BG to determine if disinfection was being accomplished.

After the chlorine treatment, the lagoon sampling results indicated that each of the BG values reported were greater than $10^5$ cfu/100 ml. Although the reported chlorine values produced by the on-site chlorinator were consistently above 5 mg/L, the field methodology of delivering the chlorine disinfectant to the lagoon without the bladder tanks was ineffective for disinfection of such a dirty water source. The highest free chlorine residual detected in the lagoon was 0.03 mg/L, but the highest total chlorine residual detected was 1.71 mg/L. This indicated that the free chlorine being generated by the mobile treatment system was being transformed into total (or combined) chlorine once it entered the lagoon. The large exposed surface area of the lagoon, in combination with shallow depth and intense sunlight may all have contributed to the rapid degradation of the chlorine delivered to the lagoon. Another confounding factor was the high organic load from the dusty lined lagoon. Thus, the inventors concluded that temporary storage bladders may need to be used in emergency situations to provide sufficient contact time, reduce surface area, remove the adverse effects of sunlight on the disinfection process, and reduce the impact of the organic load that could be found in the environment.

Bladder Tank Chlorinator Testing

The next experiment was designed to assess the ability of the mobile treatment system to disinfect a large volume of water containing BG spores using the bladder tank rather than the lagoon (US EPA, 2016a).

As in the previous experiment, the lagoon contained dirt and sediment from the surrounding area. Disinfection experiments with the mobile treatment system chlorine generator were conducted by spiking a vendor supplied 1,250-gallon (4,732 L) tank with BG spores ($10^6$ spores/100 ml), filled with lagoon water, and then chlorinated. The system set-up only included the chlorine generator and power supply. The free chlorine flows into the bladder tank where it could disinfect the contained water. The system was operated using a 12-volt DC battery on the cart. The battery was placed on a trickle charger to maintain full charge for operational stability during testing. There is one contained volume of contaminated water that is exposed to free chlorine, which can facilitate disinfection of the BG spores over time. The bladder tank was manually agitated by pushing on its side to mix the spores. Manual agitation took place approximately every 15 minutes throughout the experiments. Before disinfection, the bladder tank was sampled to determine the initial spore density, and then the chlorination started. Subsequent samples were considered as treated, or disinfected water samples.

The bulk water samples (BWSs) for BG concentrations were collected from the same sampling port that served as both inlet/outlet of the system using the grab sampling technique in 100-ml sterile sample bottles with a 10 mg sodium thiosulfate tablet. The BWS sampling port was opened and the water was drained for 15 seconds prior to collection of the sample.

Analysis of Test Results

Data analyses and results from the disinfection experiments are presented in the following sections.

Figure 4:
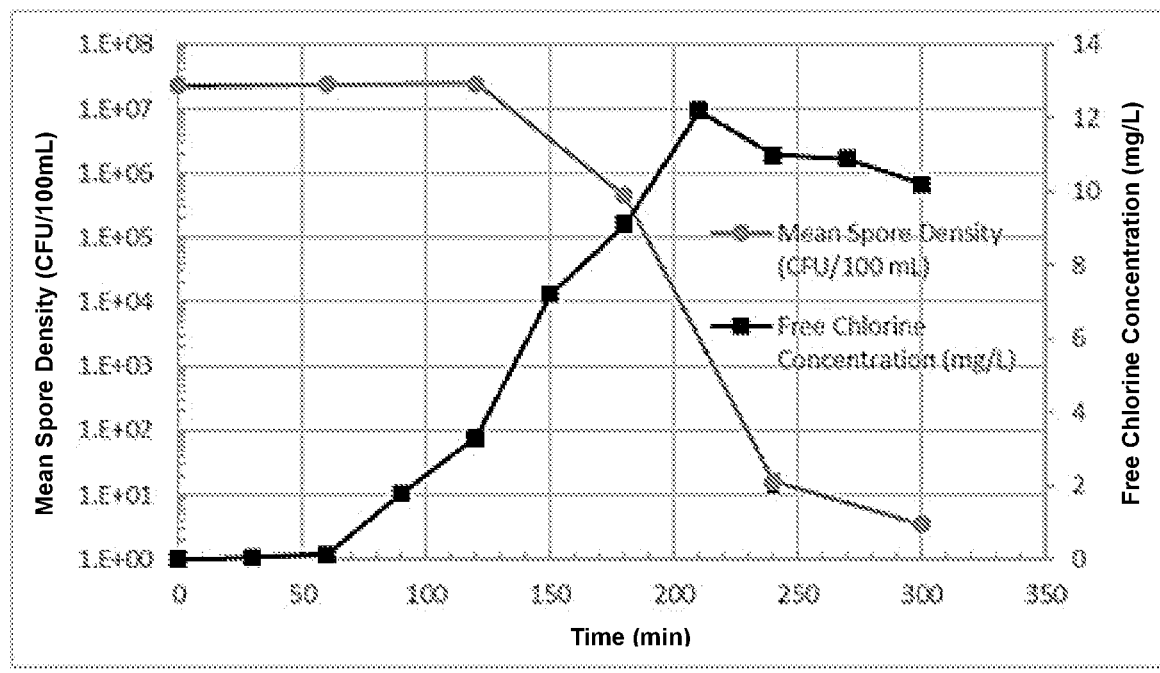
FIG. 4 is a graph of free chlorine concentration and *Bacillus globigii* spore density over time in a bladder tank when testing was conducted using one embodiment of the mobile water treatment system of the invention.

FIG. 4 shows the increase in free chlorine concentration inside the mobile treatment system bladder tank over the course of the experiment, and the subsequent decrease in BG spores. No free chlorine was detected in the water at the time the experiment began. During the first 60 minutes after the chlorinator was turned on, the free chlorine concentration in the bladder tank increased slowly due to the organic demand in the water (turbidity was measured as 11 to 13 NTU). However, after the first hour, the demand was overcome and free chlorine in the bladder tank increased at a faster rate. The chlorinator was turned off after 210 minutes. The free chlorine was around 12 mg/l free chlorine at that time. The subsequent free chlorine samples reflect the decay due to demand and temperature in the bladder tank.

At the start of the experiment, BG spores were mixed in the bladder tank volume by pushing on the outside of the bladder tank to slosh the water around and promote mixing. The first three samples taken from the bladder tank show that the volume was well mixed. BG spore density averaged $2.4 \times 10^7$ cfu/100 ml over the first three samples. FIG. 4 shows that even as the free chlorine concentration rose from 0.14 to 3.30 mg/L in 60 to 120 minutes, spore density remained the same. This is due to a well-known phenomenon in the field of disinfection knowns as a "lag phase" or "shoulder." Bacillus spores are well known to be resistant to inactivation via oxidative disinfectants, and their concentration will remain stable for a period time in the presence of disinfectants before decreasing (AWWA, 1999; Rice et al., 2005). Once free chlorine did inactivate the BG spores, approximately 7-log reduction was achieved after 300 minutes of contact time.

FIG. 5 displays the log reduction of BG spores plotted against disinfectant (free chlorine) concentration multiplied by the contact time with the disinfectant (Ct). The Ct concept is often used in the disinfection field to determine the combination of disinfectant concentration and contact time needed to achieve a log reduction for a microorganism at fixed pH and temperature conditions. If the disinfection kinetics are linear, different combinations of disinfectant concentration and contact time can yield the same Ct (AWWA, 1999). Often, disinfection kinetic curves for *Bacillus* spores developed using empirical data are not linear due to the "lag phase" or shouldering phenomenon mentioned earlier in this section. The disinfection kinetics displayed in FIGS. 4 and 5 are not linear, and this non-linearity is exacerbated by the presence of disinfectant demand (dirty water) in the lagoon water as well as varying temperature over the course of the experiment.

Ct values have been compiled in the literature for disinfection of pathogenic and non-pathogenic *Bacillus* spores. These Ct values were often collected in experiments focused on disinfection of drinking water, which generally has less disinfectant demand than the lagoon water used in these experiments. For example, a Ct of 106 mg-min/L was needed for a 3-log reduction of *B. anthracis* Ames at pH 7 and 25° C. in the presence of 1 mg/L free chlorine. The 3-log reduction Ct value for BG spores at similar conditions was 136 mg-min/L (US EPA, 2012). In the experiments with lagoon water, the 3-log reduction Ct was 707 mg-min/L at pH 7 and a temperature ranging from 20 to 25° C.

Some of the increase in the Ct values found in lagoon water comes from the fact that the temperature started lower than in the drinking water Ct experiments (15° C. to 25° C.), where temperature was constant (25° C.). Disinfectant concentration is generally fixed in lab Ct studies, whereas in this experiment it had to increase from zero once the chlorinator was started. Furthermore, disinfectant demand is much less of a factor in lab studies, unlike this field study where disinfectant concentration had to build over time in the presence of an organic load. These factors resulted in a Ct value that is approximately 5 to 6 times higher than those found for the same or similar spores observed under drinking water treatment conditions.

In summary, the mobile water treatment system achieved 6.8 log removal in a 1,250-gallon (4,732 L) bladder tank within 5 hours of the start of the experiment while achieving 12.2 mg/L free chlorine. This was a small volume and appropriate under certain scenarios, but evaluation of larger volumes of water under flow-through conditions are also needed to be challenged and will discussed later.

Table 1 contains a summary of the mobile treatment system technology-specific equipment observations recorded during the treatment experiments and considerations for similar field deployments. The terms Low, Medium and High are the opinions of the inventors and are based on their experience operating the equipment in the field. The text in the table is meant to support these opinions, and they are specific to this piece of equipment. Other equipment operators may come to different conclusions under different conditions.

unit is customizable with flow rates ranging up to 10 gallons per minute (gpm) (37.85 L/min). In addition to chlorine-based disinfection, the mobile treatment system first utilizes 100 micron and 25 micron disc pre-filters to remove particulates. The small media cartridges were replaced with larger media tanks to prolong filter life. In many situations, media such as granular activated carbon (GAC) is a likely choice given its ability to remove a broad spectrum of chemical contaminants. Other types of media may be used for their ability to remove radioactive or other types of inorganic contamination.

The mobile treatment system is self-contained and self-supported; therefore, it does not require any additional installation beyond connections to the raw water source and electric power. If necessary, the mobile treatment system can also be powered by a generator that comes with the cart. This embodiment (version 3.0) of the mobile treatment system utilizes a user-friendly duel-fuel gasoline/propane 3,500-watt generator. The chlorine generator and a small recirculation pump may be powered by a deep cycle marine battery and charged by a solar panel.

This embodiment addressed several other issues. The frame of the cart was slightly increased to accommodate the generator, the larger media tanks, and other possible treatment devices such as UV LED and/or ultrafiltration membranes if required by the particular emergency response incident. The new frame material is polymer-coated steel. The cart frame can now be pre-cut and assembled without welding enabling size adjustments according to the situational needs without waiting on frame design, welding, and

TABLE 1

Technology-specific Consideration and Observations*

| Technology Considerations | Rating and Comments |
|---|---|
| Market Availability | High. Commercially available off-the-shelf product from a non-profit organization for producing drinking water in communities in developing countries. Self-contained kit could be used in disaster zone to purify water if there was no power available from the electrical grid. |
| Capital Cost | Medium (estimate $15,000). Includes storage bladders, pump, battery, charger, solar cell, mounting/transportation rack, and salt-based chlorine generator (chlorinator). |
| Shipment to Site | Medium. Needs to go on a truck or commercial transportation. Could be transported in a smaller vehicle, if mounting and transportation rack are not used. |
| Setup Considerations | Medium. Need flat surface to spread out the bladder tanks. Need to recirculate chlorinated water to provide contact time for disinfection. Not a flow through system. Test kit (strips or colorimetric) required to periodically check chlorine generation. After disinfection, if chlorine is not consumed, the excess chlorine may need to be neutralized before being discharged to the environment. |
| Operational Considerations | Low. Simple to operate on a short-term basis. If extended contact period is required greater than 3 hours, the salt solution needs to be replenished, electrolytic cell must be drained, and, if not on 110-volt AC power, the battery needs to be charged. |
| Maintenance and Consumables | Low. Table salt is the only consumable. For optimal chlorine generation, the electrolytic cell needs to be cleaned periodically. Gasoline or propane for generator. Pumps, hoses and O-rings need to be checked periodically for wear and cracking. |
| Result Summary | Under the tested conditions, a 7-log removal of *Bacillus globigii* was observed in a batch type operation with 300-minutes of contact time. |

Full-Scale Deployment

Description of an Embodiment of the Mobile Water Treatment System

The saltwater chlorine gas generator is at the heart of another embodiment of the mobile treatment system. The powder coating. Larger wheels were added to insure better mobility on different terrains and with the larger frame.

The use of schedule 80 solvent piping and valves was changed to PEX (cross-linked polyethylene) piping and brass for durability. An additional section of PEX piping was inserted into the frame to accommodate extra filters or other accessories such as UV disinfection or additional filtration.

The extra room of the larger cart allowed for the installation of five 1-liter containers of the new WaterStep Bleach-Makers. This enables the production of a 1% solution of liquid bleach concurrently with the water treatment. The bleach solution can then be used for general cleaning and support of medical triage by emergency personnel.

This embodiment of the mobile treatment system of the invention still fits on a standard skid and weighs less than 700 pounds (weight will vary depending on tank bladder size). A new Single Hole Manifold for connections from the mobile treatment system to the bladder tanks was developed. This manifold allowed for the reduction in the amount of plumbing (hoses) and has proven to be much more user friendly to re-circulate the stored water. Auxiliary 120 v electrical outlets, and USB ports have also been added into the system for on-site access to recharge phones, tablets, and lap-tops.

Secondary Wastewater Challenge

The Secondary Wastewater challenge evaluated the ability of another embodiment of the mobile treatment system ($3^{rd}$ generation mobile treatment system) to disinfect a turbid non-chlorinated secondary effluent discharged from the Greater Cincinnati Metropolitan Sewer District's Gest St. Wastewater Treatment Plant. Secondary wastewater was selected to simulate a contaminated surface drinking water source or a combined stormwater and sanitary sewer effluent. The challenge was based on free chlorine residual produced by the chlorine gas generator and the subsequent inactivation of *Escherichia coli* and total coliforms in the secondary effluent. (Total coliforms are a group of related bacteria that are common in the environment [soil and vegetation] and are used as a general indicator of drinking water quality.) This unit was evaluated at the EPA Test and Evaluation (T&E) Facility, located in Cincinnati, Ohio.

Non-chlorinated secondary effluent enters the T&E Facility directly from the Greater Cincinnati Metropolitan Sewer District through an 8-inch PVC pipe. For this experiment, a portion of the secondary effluent flow was directed into a 1,000-gallon stainless steel tank located on the floor of the T&E high bay. The mobile treatment system was connected to the tank through a manifold. The mobile treatment system's optional onboard jet pump pulled the secondary effluent from the tank through the disc pre-filters and then through the chlorine generator. The treated water was then pumped into the 1,250-gallon bladder tank.

The test was performed on Jun. 27, 2018. The secondary effluent made a single pass through mobile treatment system's disc pre-filters and then through the chlorinator and was discharged into the bladder tank. The water flow through the mobile treatment system was approximately 6 gpm (22.71 liters per minute).

When the bladder tank was approximately half full (~660 gallons), the secondary effluent flow from the tank was shut off to mobile treatment system and the pump lines were reconfigured to allow the bladder contents to continuously recirculate through mobile treatment system's disinfection system and back into the bladder tank. The manifold "mixer" bar inside the bladder tank was used to mix and recirculate the water within the bladder tank. The recirculation and chlorination of the secondary effluent continued for one hour. The water passed through the chlorinator throughout the entire test period.

Analysis of Test Results

During the test, inlet and outlet samples from mobile treatment system were collected and analyzed for *E. coli* and total coliforms. The secondary effluent was the source of the bacteria microorganisms: *E. coli* and total coliforms. The inlet samples were collected from mobile treatment system's lower sample port located just before the water enters the mobile treatment system's disinfection device, while the outlet samples were collected from the port on the short side of the mixer manifold located at the bladder inlet. Samples were collected as the bladder was being filled and during the recirculation of the water through the bladder tank. Throughout the test, the inlet and outlet water were analyzed for free and total chlorine. Results of these analyses are presented in Table 2. The blue-green color of the inlet secondary effluent sample (left) was stripped from the water and the resulting outlet sample was clear.

TABLE 2

Chlorine Concentrations at the mobile treatment system's Outlet (single pass)

| Sample Time | Free chlorine, mg/L | Total chlorine, mg/L |
|---|---|---|
| Startup - single pass through cart | 0.06 | 0.12 |
| 20 minutes of single pass water | 12 | 14.2 |
| 2 hours of single pass water | 13.6 | 15.4 |
| 2.5 hours of single pass water | 12.9 | 14.1 |
| Start recirculation in bladder tank | | |
| 30 minutes of recirculating water | 23 | 27 |
| 45 minutes of recirculating water | 25 | 31 |
| 1 hour of recirculating water | 27 | 33 |

Note:
It was not necessary to achieve these high chlorine levels to completely disinfect the *E. coli*. It was just done to demonstrate the capability of the system The *E. coli* samples were analyzed at the T&E Facility Biosafety Level (BSL) 2 Laboratory following the APTIM T&E SOP [Standard Operating Procedure] 310, Revision 2: "Total Coliform and *E. coli* Analysis Using IDEXX Colilert-18." The 100 ml samples and/or diluted samples were mixed with Colilert®-18 media powder (IDEXX Laboratories, Inc., Westbrook, Me.). When the media powder dissolved, the sample-media mixture was poured into an IDEXX Quanti-tray®/2000. After incubating at 35° C. for 24 hours, the trays are examined under UV light to count the number of fluorescent wells. The number of fluorescent wells is cross-referenced with a most probable number (MPN) table to obtain the MPN of *E. coli* in the original sample.

The results from the *E. coli* and total coliform analyses of water samples collected from the mobile treatment system are summarized in Table 3. Individual inlet concentrations were compared to the corresponding outlet concentrations to compute the log reduction values shown in Table 3. Log reduction values for *E. coli* and total coliforms from the initial outlet samples were not presented since the chlorination had not started. The data show that *E. coli* and total coliforms were removed to below the level of detection by mobile treatment system during the first 15 minutes of the recirculation of the water through the bladder tank. Comparing inlet and outlet *E. coli* concentrations, the mobile treatment system produced log reductions up to 2.8 while operating in the single pass mode. Log reductions of 4 or greater (complete removal of *E. coli* and total coliforms) were achieved while recirculating the contents of the bladder tank. As shown in Table 2, this is most likely due to the higher chlorine concentrations present in the recirculated bladder tank water. Utilizing the recirculating manifold from the initial start-up would have most likely reduced the time to complete inactivation of the *E. coli* and total coliforms.

TABLE 3

Mobile treatment system Summary of *E. coli* and Total Coliforms Disinfection Results

| Sample Condition | Total Elapsed Time (min) | Inlet *E. coli* (MPN/100 ml) | Inlet Total Coliforms (MPN/100 ml) | Outlet *E. coli* (MPN/100 ml) | Outlet Total Coliforms (MPN/100 ml) | *E. coli* Log Reduction | Total Coliforms Log Reductions |
|---|---|---|---|---|---|---|---|
| Single Pass through the mobile treatment system | | | | | | | |
| Started filling bladder with secondary wastewater and turned on chlorinator | | | | | | | |
| Initial | 2 | 1.07E+04 | 2.40E+05 | 1.50E+04 | 2.40E+05 | NA | NA |
| 330 gal in bladder | 42 | 2.00E+04 | 1.60E+05 | 6.40E+01 | 6.10E+02 | 2.4 | 2.6 |
| 660 gal in bladder | 143 | 1.40E+04 | 2.04E+05 | 2.70E+01 | 3.00E+02 | 2.8 | 2.9 |
| Average inlet concentration | | 1.70E+04 | 2.13E+05 | | | | |

*E. coli* and Total Coliforms were removed below detection level within 15 minutes of recirculation NA - Log reduction cannot be calculated at start-up of the test WSTB Microbial and Diesel Fuel Challenge The objective of this test was to next evaluate the efficacy of the mobile treatment system treatment train to decontaminate a mixed water supply contaminated with bacteria and petroleum-based chemicals. The scenario is reflective of a surface water contaminated by a barge spill or flood waters contaminated with untreated sewage.

The mobile treatment system was unpacked and wheeled to its location adjacent to the lagoon. For this experiment, the lagoon was to be filled to ~7,000 gallons of potable water from the Water Security Test Bed pipeline. Prior to the mobile treatment system being deployed, the main WSTB pipeline experienced a severe joint failure flooding the area causing the lagoon to overflow, thus creating a much more realistic emergency response scenario. Power was available on-site, so the duel fuel generator was not necessary.

Non-pathogenic *E. coli* K-12 bacteria and diesel fuel were added to the lagoon. The contaminants were allowed to mix and disperse overnight. The next day, the water was pumped through the mobile treatment system. The desired contaminant concentrations in the lagoon were ~20 mg/L diesel fuel and $10^5$ MPN/100 ml *E. coli*. To achieve those concentrations throughout the lagoon the contaminants were physically mixed by walking through the lagoon. Benzene, toluene, ethylbenzene, and xylene (BTEX) make up 0.5-1.2% of typical diesel fuel. The effluent from the mobile treatment system was collected in a 2,000-gallon bladder. Water samples from the lagoon were compared to water samples taken from the bladder.

Analysis of Test Results

Table 4 describes the *E. coli* and total coliform reduction and/or inactivation of microbial contaminants by the mobile treatment system being operated in flow through mode. In order to provide increasing Ct for disinfection, bladder tank outlet samples were collected at set intervals to show an increasing disinfection rate. Effluent samples were taken from the bladder tank over time providing Contact Time. After about 45 minutes of operation, the mobile treatment system effluent showed a reduction of around 1 log of both microbial contaminants. Following another 45 minutes of treatment and contact time (90 minutes total) both the mobile treatment system effluent and bladder tank contents showed reductions of *E. coli* and total coliforms of 6 log and 4 logs respectively.

TABLE 4

Microbial Results from the Lagoon

| | Mobile Treatment System Inlet (Lagoon Source Water) | | Treated Outlet to Bladder Tank | | Recirculated Treated Bladder Tank | |
|---|---|---|---|---|---|---|
| Sample Time | Total Coliforms (MPN/100 ml) | *E. coli* (MPN/100 ml) | Total Coliforms (MPN/100 ml) | *E. coli* (MPN/100 ml) | Total Coliforms (MPN/100 ml) | *E. coli* (MPN/100 ml) |
| 15:15 | >2.4E+06 | 1.5E+04 | 2.1E+05 | 8.4E+03 | 1.7E+01 | 2.0E+00 |
| 16:00 | >2.4E+06 | 3.5E+03 | 1.0E+00 | 1.0E+00 | 1.0E+00 | ND |
| 16:45 | >2.4E+06 | 5.6E+04 | 1.0E+00 | ND | 1.0E+00 | ND |
| 17:30 | 2.4E+06 | 1.5E+05 | 1.2E+05 | 1.5E+04 | 2.0E+01 | 5.1E+01 |
| 18:15 | 1.3E+06 | 1.1E+04 | ND | ND | 2.0E+01 | ND |
| 19:00 | 1.4E+06 | 1.3E+03 | ND | ND | ND | ND |

*E. coli* and Diesel fuel added to the lagoon at 14:25 and 14:27 respectively

ND—non-detect (<1 MPN/100 mL)

Table 5 describes the influent and effluent levels of the diesel fuel components. Because of the extremely high turbidity in the lagoon (>100 NTU), the GAC filter media tanks became clogged and were removed from the mobile treatment system after 3 hours of operation prior to sampling at 17:30 hours. Results indicate that diesel range organics (DRO) C10-C20, oil range organics (ORO) C20-C34, gasoline range organics (GRO) C6-C12, and Total Petroleum Hydrocarbons (TPH) were removed through the first two hours of operation prior to the GAC being removed as shown by the BWS-4-1 sample. One sample taken at 14:00 hours indicates that DRO and TPH may have started to breakthrough given the GAC clogging prior to the removal of the GAC media.

TABLE 5

Diesel Fuel Removal Rates

| | Mobile Treatment System Inlet (Lagoon Source Water) | | | | Mobile Treatment System Outlet to Bladder Tank | | | |
|---|---|---|---|---|---|---|---|---|
| Sample Time | DRO (mg/L) | ORO (mg/L) | GRO (mg/L) | TPH (mg/L) | DRO (mg/L) | ORO (mg/L) | GRO (mg/L) | TPH (mg/L) |
| 15:15 | 6.500 | 1.300 | 0.110J | 7.910 | U | U | U | U |
| 16:00 | U | 0.120 | U | 0.120 | 0.110 | U | U | 0.110 |
| 16:45 | U | 0.120 | 0.200J | 0.320 | U | U | U | U |
| 17:30 | 0.150 | 0.140 | 0.170J | 0.460 | 0.140 | 0.120 | 0.120J | 0.380 |
| 18:15 | 0.170 | 0.170 | 0.140J | 0.480 | 0.250 | 0.120 | U | 0.370 |
| 19:00 | 0.190 | 0.140 | 0.120J | 0.450 | 0.140 | 0.110J | 0.120J | 0.370 |

| | Mobile Treatment System Inlet (Lagoon Source Water) | | | | Treated Mobile Treatment System Outlet to Bladder Tank | | | |
|---|---|---|---|---|---|---|---|---|
| Sample Time | Benzene (ug/L) | Ethylbenzene (ug/L) | Toluene (ug/L) | Total Xylene (ug/L) | Benzene (ug/L) | Ethylbenzene (ug/L) | Toluene (ug/L) | TPH (ug/L) |
| 15:15 | U | U | U | U | U | U | U | U |
| 16:00 | U | U | U | U | U | U | U | U |
| 16:45 | U | U | U | 1.200J | U | U | U | U |
| 17:30 | U | U | U | 1.200J | U | U | U | U |
| 18:15 | U | U | U | U | U | U | U | U |
| 19:00 | U | U | U | U | U | U | U | U |

*E. coli* and diesel added to the lagoon at 14:25 and 14:27 respectively
U = Non-detect value
J = Estimated value As the present invention may be embodied in several forms without departing from the spirit or essential characteristics thereof, it will be understood that the invention is not limited by the details of the foregoing description, unless otherwise specified, but rather should be construed broadly within its spirit and scope as defined in the appended claims, and therefore all changes and modifications that fall within the metes and bounds of the claims. Accordingly, the invention is defined by the appended claims.

What is claimed is:

1. A mobile water treatment system for treating contaminants in water comprising:
   (a) a polymer-coated adjustable mobile framework on top of wheels;
   (b) one or more treatment modules mounted and interchangeable on the mobile framework;
   (c) a quick connecting water distribution manifold system connected to the mobile framework, selectively enabling fluid communication with and through the one or more treatment modules, said quick connecting water distribution manifold system comprising one or more quick connect fittings, hoses and control valves to incorporate one or more pumps configured to direct water flow and velocity of the water to and from the one or more treatment modules; and
   (d) at least one power supply source to provide power to the one or more pumps and one or more treatment modules,
   wherein
   the one or more pumps convey untreated water through the quick connecting water distribution manifold system to the one or more treatment modules, and comprise(s) a chlorination treatment module;
   the one or more treatment modules, the quick connecting water distribution manifold system and the at least one power supply source are housed within the mobile framework, and
   the mobile water treatment system is configured to manually direct the flow pathway through the quick connect water distribution manifold system to the one or more treatment modules to be modified based on water treatment needs;
   the mobile water treatment system further comprising:
   (e) a bladder tank; and
   a manifold which directs recirculated chlorinated water to and from the bladder tank prior to release as sanitized chlorinated drinking water.

2. The mobile water treatment system of claim 1, wherein the chlorination treatment module generates chlorine gas by electrolysis using a chloride salt.

3. The mobile water treatment system of claim 2, wherein the chloride salt is sodium chloride.

4. The mobile water treatment system of claim 1 further comprising at least one pre-filter that filters the contaminated water prior to entering the mobile water treatment system.

5. The mobile water treatment system of claim 1, wherein the one or more treatment modules further comprise activated carbon treatment.

6. The mobile water treatment system of claim 1, wherein the one or more treatment modules further comprise treatment using a disinfecting composite material.

7. The mobile water treatment system of claim 6, wherein the disinfecting composite material comprises a silver coated composite material.

8. The mobile water treatment system of claim 7, wherein the silver coated composite material is a germicidal composite material comprising:

a support substrate;

one or more micrometric aggregates of titanium oxide on the support substrate, the titanium oxide aggregates comprising chloride atoms; and one or more micrometric aggregates of silver attached to the chloride atoms of the titanium oxide aggregates, wherein the micrometric aggregates of titanium oxide with silver atoms have a germicidal activity.

9. The mobile water treatment system of claim 8, wherein the silver atoms are metallic.

10. The mobile water treatment system of claim 8, wherein the support substrate is silica or alumina.

11. The mobile water treatment system of claim 1, wherein the manifold is a single hole manifold.

12. The mobile water treatment system of claim 1, wherein the contaminants comprise volatile organics, non-volatile organics, particulates, pathogens, viruses, parasites, metals, or mixtures of the same.

13. The mobile water treatment system of claim 1, wherein water is treated at a rate from 5 to 10 gallons per minute.

14. The mobile water treatment system of claim 1, wherein the one or more treatment modules further comprise a UV treatment module.

15. The mobile treatment system of claim 1, wherein the water is drinking water.

16. The mobile water treatment system of claim 1, wherein the chlorination treatment module injects chlorine gas into the water, providing a chlorine residual.

17. The mobile water treatment system of claim 1, wherein the bladder tank in conjunction with the recirculated chlorinated water and the manifold are to perform a 7 log reduction of anthrax surrogate and to remove 4-6 Logs of *E. coli* and total coliforms.

18. The mobile water treatment system of claim 1, further comprising a venturi tube connected to the chlorination treatment module, to introduce chlorine gas into the water.

19. The mobile water treatment system of claim 1, wherein the one or more treatment modules are plural, and the quick connect fittings, hoses and control valves enable interchangeable water treatment technologies to be added and/or deleted from the mobile framework.

20. The mobile water treatment system according to claim 1, wherein:

the quick connecting water distribution manifold system locates the one or more treatment modules in parallel with the quick connect fittings, hoses and valves located on both an inlet and an outlet side of the one or more treatment modules; and the mobile framework has a maximum dimension area of 32"×48" to convey the water through the one or more treatment modules.

21. The mobile water treatment system according to claim 1, wherein the chlorination treatment module comprises a a chlorine gas generator.

22. The mobile water treatment system of claim 1, wherein the chlorination treatment module generates chlorine gas by electrolysis using a membrane which separates first and second liquid solutions of an electrolytic cell and allows sodium from salt/sodium chloride to pass, leaving chloride behind which produces chlorine gas;

the mobile water treatment system further comprising a single pass U-tube heat exchanger to expedite the electrolysis.

23. A mobile treatment system for treating contaminants in water comprising:

(a) a polymer-coated mobile framework on top of wheels;

(b) one or more treatment modules mounted and interchangeable on the mobile framework;

(c) a quick connecting water distribution manifold system connected to the mobile framework, selectively enabling fluid communication with and through the one or more treatment modules, said quick connecting water distribution manifold system comprising one or more quick fittings, hoses and control valves to incorporate one or more pumps configured to direct water flow and velocity to and from the one or more treatment modules;

(d) at least one power supply source to provide power to the one or more pumps and one or more treatment modules; and (e) at least one pre-filter that filters the contaminated water prior to entering the mobile water treatment system, wherein the one or more pumps convey untreated water through the quick connecting water distribution manifold system to the one or more treatment modules, and comprises (i) a chlorination treatment module that generates chlorine gas by electrolysis of sodium chloride, (ii) an activated carbon treatment module and (iii) a treatment module using a disinfecting composite material comprising a silver coated composite material, and the one or more treatment modules, the quick connect water distribution manifold system and the at least power supply source are housed within the mobile framework;

the mobile water treatment further comprising:

a bladder tank; and a manifold which directs recirculated chlorinated water to and from the bladder tank prior to release as sanitized chlorinated drinking water.

24. The mobile water treatment system of claim 23, wherein the quick connecting water distribution manifold system is configured to convey water to and from the one or more treatment modules in a flow pathway through the one or more treatment modules based on water treatment needs.

25. The mobile water treatment system of claim 24, wherein the one or more power sources comprise at least one member of the group consisting of a battery, a solar cell, utility electric power, and a generator.

* * * * *